US010523342B1

United States Patent
Kuzdeba et al.

(10) Patent No.: US 10,523,342 B1
(45) Date of Patent: Dec. 31, 2019

(54) AUTONOMOUS REINFORCEMENT LEARNING METHOD OF RECEIVER SCAN SCHEDULE CONTROL

(71) Applicant: BAE SYSTEMS Information and Electronic Systems Integration Inc., Nashua, NH (US)

(72) Inventors: Scott A Kuzdeba, Framingham, MA (US); Jonathan M. Sussman-Fort, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/351,037

(22) Filed: Mar. 12, 2019

(51) Int. Cl.
| | | |
|---|---|---|
| *H04B 17/345* | (2015.01) | |
| *H04B 17/00* | (2015.01) | |
| *G01S 7/481* | (2006.01) | |
| *H04B 17/21* | (2015.01) | |
| *H04B 17/11* | (2015.01) | |

(52) U.S. Cl.
CPC ........ *H04B 17/0085* (2013.01); *G01S 7/4817* (2013.01); *H04B 17/11* (2015.01); *H04B 17/21* (2015.01)

(58) Field of Classification Search
CPC ............... H04B 17/0085; H04B 17/11; H04B 17/20–382; G01S 7/4817
See application file for complete search history.

(56) References Cited

U.S. PATENT DOCUMENTS

| | | | | |
|---|---|---|---|---|
| 7,400,612 B2* | 7/2008 | Yamaura | ................ | H04B 1/401 370/338 |
| 7,545,308 B2* | 6/2009 | Mitsugi | ................... | G01S 7/021 342/20 |

(Continued)

OTHER PUBLICATIONS

K. Karra, S. Kuzdeba, and J. Petersen, "Modulation recognition using hierarchical deep neural networks," in 2017 IEEE International Symposium on Dynamic Spectrum Access Networks (DySPAN), 2017, pp. 1-3.

(Continued)

*Primary Examiner* — James M Perez
(74) *Attorney, Agent, or Firm* — Maine Cernota & Rardin

(57) ABSTRACT

A method of detecting electromagnetic signal sources of interest includes applying reinforcement learning to automatically and continuously update a receiver scan schedule wherein an agent is reinforced according to comparisons between expected and actual degrees of success after each schedule update, actual degrees of success being estimated by applying to signal data a plurality of value scales applicable to a plurality of reward classes. An exponential scale can be applied across the plurality of reward classes. A companion system can provide data analysis to the agent. The agent can include an actor module that determines schedule updates and a critic module that determines the degrees of scanning success and awards the reinforcements. Embodiments implement a plurality of agents according to asynchronous multiple-worker actor/critic reinforcement learning. The method can be initially applied to training data comprising synthetic and/or previously measured signal data for which the signal sources are fully characterized.

24 Claims, 6 Drawing Sheets

(56) References Cited

U.S. PATENT DOCUMENTS

| | | | | |
|---|---|---|---|---|
| 7,940,869 B2* | 5/2011 | Tandai | ............... | G01S 7/021 342/52 |
| 7,965,384 B2* | 6/2011 | Drinkard | ............... | G01S 7/4812 356/4.01 |
| 7,966,276 B2* | 6/2011 | Cade | ............... | G05B 17/02 700/104 |
| 8,582,704 B2* | 11/2013 | Axnas | ............... | H04B 1/1027 375/346 |
| 8,611,293 B2* | 12/2013 | Xin | ............... | H04W 72/02 370/329 |
| 8,798,548 B1* | 8/2014 | Carbajal | ............... | H04W 24/08 455/67.11 |
| 9,053,433 B2* | 6/2015 | Will | ............... | B60W 40/06 |
| 9,165,372 B2* | 10/2015 | Williams | ............... | G06T 7/20 |
| 9,167,165 B2* | 10/2015 | Kuzdeba | ............... | H04N 5/23293 |
| 9,715,004 B2* | 7/2017 | Faragher | ............... | G01S 5/0263 |
| 9,768,894 B2* | 9/2017 | Chowdhery | ............... | G06K 9/00496 |
| 10,222,474 B1* | 3/2019 | Raring | ............... | G01S 17/023 |
| 2003/0169697 A1* | 9/2003 | Suzuki | ............... | H04L 47/14 370/310 |
| 2004/0048609 A1* | 3/2004 | Kosaka | ............... | H04W 56/002 455/422.1 |
| 2004/0157580 A1* | 8/2004 | Stadelmeier | ............... | H04W 16/14 455/338 |
| 2005/0032524 A1* | 2/2005 | Kruys | ............... | G01S 7/021 455/454 |
| 2005/0282551 A1* | 12/2005 | Tandai | ............... | H04W 4/10 455/447 |
| 2009/0086189 A1* | 4/2009 | Drinkard | ............... | G01S 7/4812 356/5.01 |
| 2009/0092284 A1* | 4/2009 | Breed | ............... | B60J 10/00 382/103 |
| 2009/0299496 A1* | 12/2009 | Cade | ............... | G05B 13/024 700/29 |
| 2009/0323609 A1* | 12/2009 | Walton | ............... | H04W 48/16 370/329 |
| 2010/0109867 A1* | 5/2010 | Williams | ............... | G06K 9/00778 340/540 |
| 2010/0151857 A1* | 6/2010 | Brisebois | ............... | H04W 24/10 455/434 |
| 2010/0151858 A1* | 6/2010 | Brisebois | ............... | H04W 24/10 455/434 |
| 2011/0002371 A1* | 1/2011 | Forenza | ............... | H04B 7/0417 375/227 |
| 2012/0142386 A1* | 6/2012 | Mody | ............... | H04W 16/14 455/509 |
| 2013/0086267 A1* | 4/2013 | Gelenbe | ............... | H04L 45/302 709/225 |
| 2014/0036103 A1* | 2/2014 | Kuzdeba | ............... | H04N 5/23293 348/222.1 |
| 2015/0256417 A1* | 9/2015 | Gelenbe | ............... | H04L 45/302 709/224 |
| 2016/0100521 A1* | 4/2016 | Halloran | ............... | A01D 34/008 180/169 |
| 2016/0377705 A1* | 12/2016 | Zack | ............... | G01S 7/414 342/21 |
| 2016/0379462 A1* | 12/2016 | Zack | ............... | G08B 21/043 340/539.12 |
| 2017/0048010 A1* | 2/2017 | Chowdhery | ............... | G06K 9/00496 |
| 2017/0098166 A1* | 4/2017 | Lau | ............... | G06N 5/041 |
| 2017/0200358 A1* | 7/2017 | Fang | ............... | G01S 17/026 |
| 2017/0243138 A1* | 8/2017 | Dzierwa | ............... | H04W 24/08 |
| 2017/0261604 A1* | 9/2017 | Van Voorst | ............... | G01S 7/51 |
| 2017/0280463 A1* | 9/2017 | Learned | ............... | H04L 5/00 |
| 2017/0374573 A1* | 12/2017 | Kleinbeck | ............... | H04W 16/14 |
| 2018/0011175 A1* | 1/2018 | Faetani | ............... | G01S 7/4817 |
| 2018/0039990 A1* | 2/2018 | Lindemann | ............... | G06F 21/31 |
| 2018/0059248 A1* | 3/2018 | O'Keeffe | ............... | G01S 7/4817 |
| 2018/0103404 A1* | 4/2018 | Emmanuel | ............... | H04W 28/04 |
| 2018/0367553 A1* | 12/2018 | Hayden | ............... | H04L 63/1425 |
| 2019/0052294 A1* | 2/2019 | Abdelmonem | ............... | H04B 17/318 |
| 2019/0120965 A1* | 4/2019 | Choiniere | ............... | G01S 17/89 |
| 2019/0179026 A1* | 6/2019 | England | ............... | G05D 1/0231 |
| 2019/0180502 A1* | 6/2019 | England | ............... | G05D 1/0231 |
| 2019/0204423 A1* | 7/2019 | O'Keeffe | ............... | G01S 7/4817 |

OTHER PUBLICATIONS

Volodymyr Mnih et al, Asynchronous Methods for Deep Reinforcement Learning, Proceedings of the 33rd International Conference on Machine Learning, New York, NY. USA, 2016. JMLR: W&CP colume 48, Copyright 2016 by authoir(s), 19 pages.

* cited by examiner

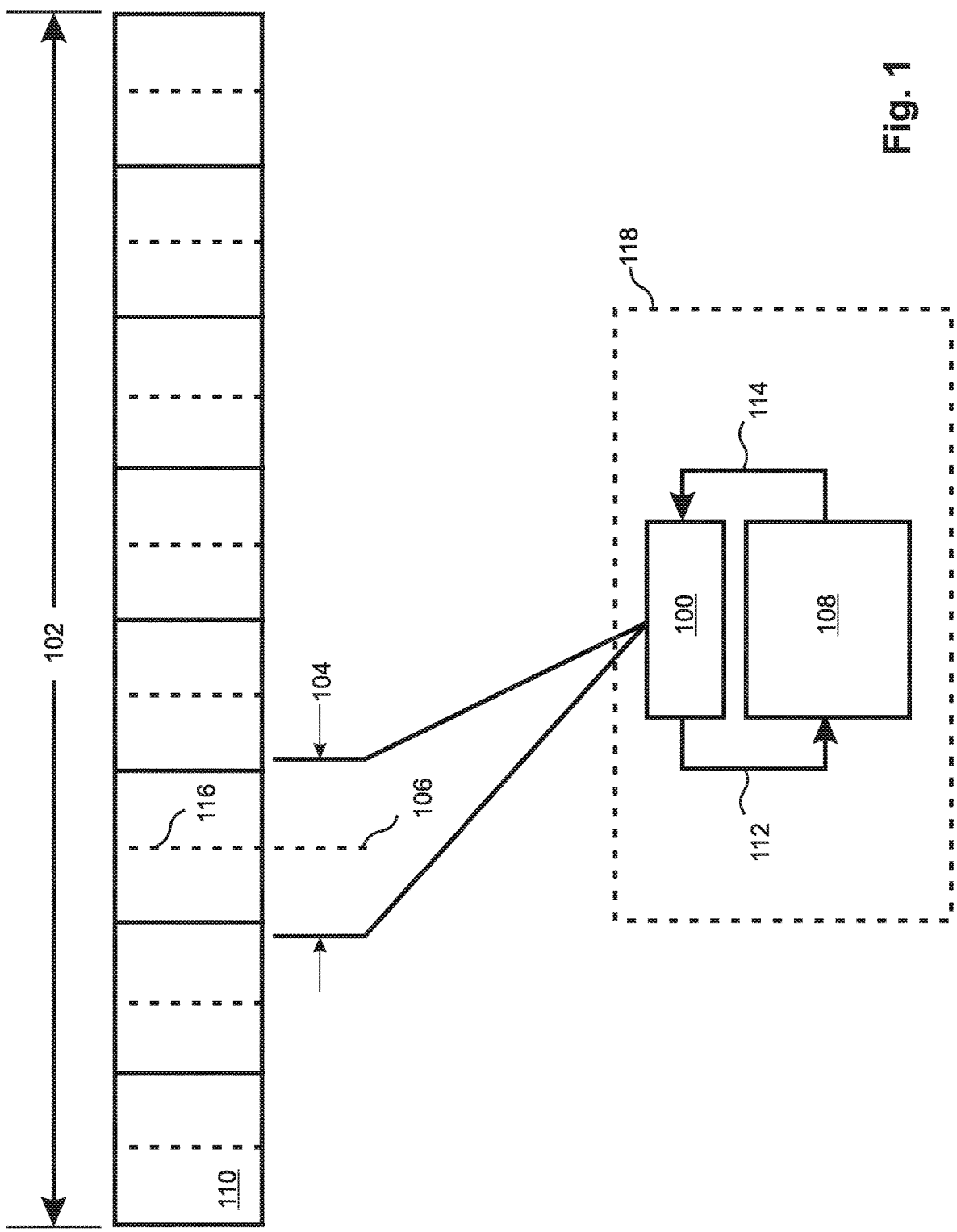

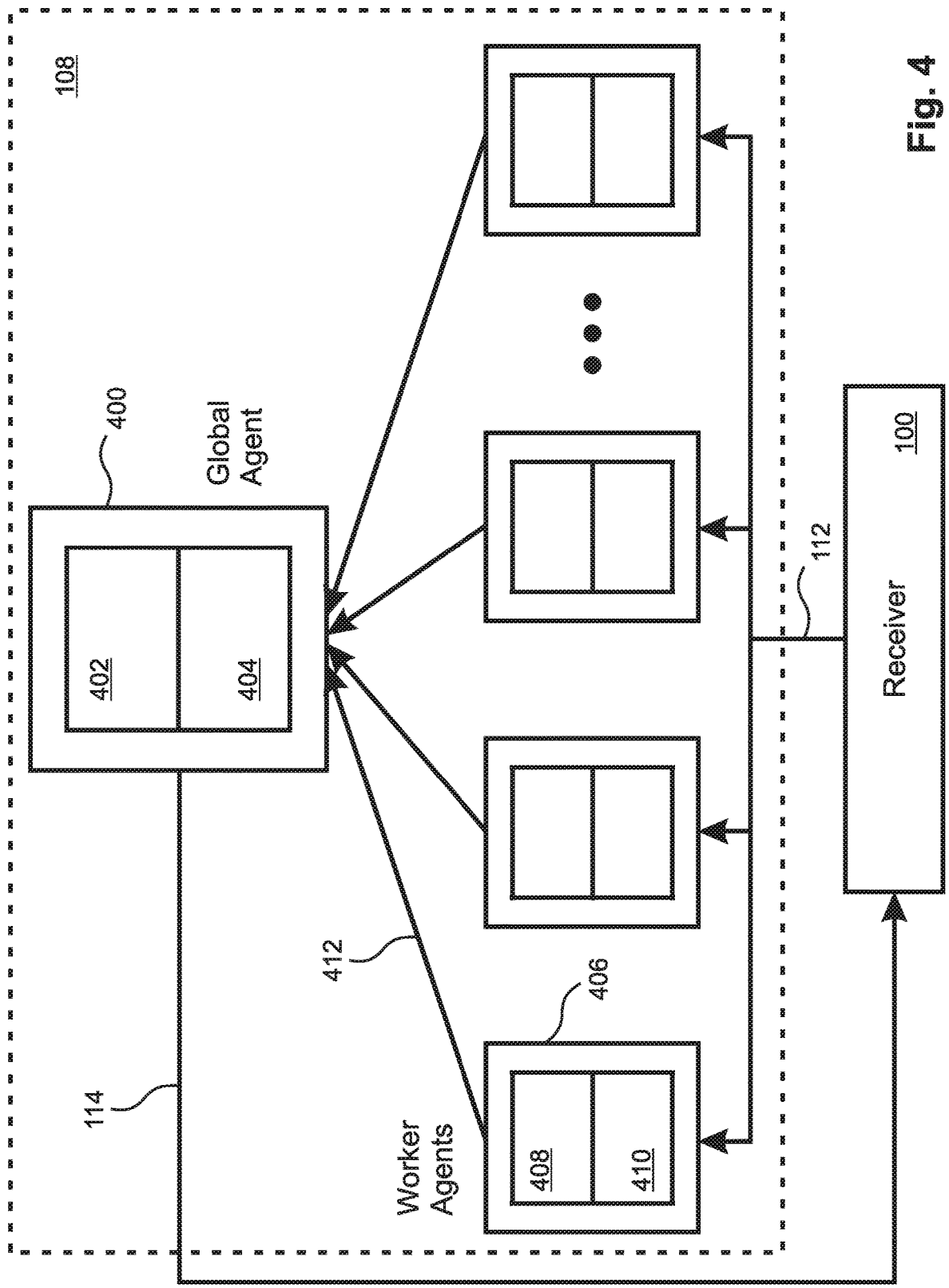

AUTONOMOUS REINFORCEMENT LEARNING METHOD OF RECEIVER SCAN SCHEDULE CONTROL

FIELD

The disclosure relates to methods of controlling an electromagnetic ("EM") signal receiver, and more particularly to methods of scheduling the scanning of an EM signal receiver within an electromagnetic spectrum of interest that is wider than a selected bandwidth.

BACKGROUND

It can be highly desirable in the context of electronic warfare ("EW"), as well as under various other circumstances, to monitor a broad electromagnetic spectrum of interest so as to detect the presence, behavior, and properties of electromagnetic ("EM") signals transmitted by EM sources that are within detection range of an EM signal receiver and in some examples are not known a priori to a user. Such EM signal receivers are generally tunable over the entire spectrum of interest, but use a reception bandwidth that is significantly narrower than the spectrum of interest, such that they must be frequently retuned between various frequencies within the spectrum so as to sample the EM activity throughout the entire spectrum of interest. This process of frequent retuning of a receiver within a broad spectrum of interest is referred to herein as "scanning," and the timing and frequency pattern of the scanning is referred to herein as the "scan schedule."

Often, the spectrum of interest is divided into a plurality of contiguous frequency "channels," each of which is narrower than the bandwidth of the signal receiver, and the signal receiver is shifted between the center frequencies of these channels according to the scan schedule.

Various goals can motivate the monitoring of a spectrum of interest by an EM receiver. These can include determining the number of EM sources that are within detection range, determining the locations of the EM sources, determining the apparent types of the EM sources (as indicated by characteristics of their transmitted signals), or any combination thereof. Under EW conditions, for example, scanning can be helpful for determining numbers and types of nearby hostile assets, intercepting adversary communications for intelligence analysis, directing jamming signals that interfere with adversary communications, and/or avoiding hostile jamming efforts.

Often, transmissions from some EM sources may be of little or no interest, while transmissions from other EM sources may be of high interest. Accordingly, relative degrees of interest may be assigned to various EM sources, whereby detection of EM signals of highest interest are given priority, while signals from other EM sources are given secondary importance or ignored completely.

Typically, a system that is used to scan and monitor a spectrum of interest includes an EM signal receiver that detects and records EM transmissions, a controller that controls the EM signal receiver and implements the scan schedule, and possibly also a companion system that analyzes the received signals so as to extract information therefrom, which may include distinguishing types of EM sources and determining their relative degrees of interest.

If all of the EM sources of interest that are within detection range of an EM signal receiver are relatively persistent in time and constant in broadcast frequency, then it can be a simple matter to scan through the spectrum of interest, identify the signals of interest, and implement a scan schedule that is mainly limited to the frequencies where the signals of interest have been detected, while possibly repeating a full scan of the spectrum of interest at intervals so as to detect the arrival of any new EM sources of interest.

However, it is increasingly common for EM signals of interest to be transient in time and/or variable in transmission frequency. For example, transmissions that originate from aircraft may move in and out of range relatively quickly. RADAR signals may vary in their transmitted direction, and therefore may be detected with an amplitude that is periodic or otherwise variable. Transmissions that originate from ground-based vehicles may also be intermittent in both amplitude and time as the vehicles change location, and as various intervening obstructions temporarily interrupt the transmitted signals. In addition, many transmissions of interest in an EW environment employ frequency "hopping" according to a pseudo-random pattern that renders detection, jamming, and signal interception more difficult.

Accordingly, efficient monitoring of signals of interest in an EW environment often depends upon accurate predictions of future transmission patterns based upon a sophisticated analysis of previously received signals.

One approach is to collect and analyze a quantity of EM signal detections, construct a scan schedule using some combination of computational and manual resources, and then configure a controller to cause a signal receiver to implement the scan schedule. This approach can be effective when the EM sources of interest are relatively consistent in their behavior over time.

However, as EM sources of interest have become increasingly more sophisticated, their behavior has become increasingly variable, causing the efficacy of such pre-determined scan schedules to degrade rapidly, and requiring frequent updates to the scan schedule based on newly acquired data. Often, the time required to develop new scan schedules, especially when human resources are applied, lags behind the rate at which EM sources vary their behavior, leading to degradation of scan performance.

What is needed, therefore, is a method of rapidly updating a scan schedule for an EM signal receiver that will optimize the receipt of signals of interest based on predictions of EM source behavior even when said behavior is variable.

SUMMARY

The present disclosure is a system and method of updating a scan schedule for an EM signal receiver that optimizes the receipt of signals of interest from within a spectrum of interest based on predictions of EM source behavior even when said behavior is variable.

The present disclosure is applicable to circumstances wherein at least one EM source is transmitting at least one EM signal of interest over at least one frequency within the spectrum of interest according to a transmission pattern that is not known a priori to a user, and wherein the EM signal receiver is configured to detect signals transmitted at frequencies that lie within a receiver bandwidth that surrounds a "tuned" frequency to which the EM signal receiver is tuned, wherein the receiver bandwidth is narrower than the spectrum of interest. Accordingly, the EM signal receiver is configured to "scan" the spectrum of interest so as to discover and monitor as many signals of interest as possible within the spectrum of interest. Specifically, a controller of the signal receiver directs the receiver to shift its tuned frequency in a time-dependent manner, according to a "scan schedule" that dictates the timing and frequency pattern of the scanning, so as to discover and monitor signals of interest throughout the spectrum of interest. In embodiments, the spectrum of interest is divided into a plurality of "channels" each of which has a frequency width that is not larger than the bandwidth of the receiver, and the scan schedule controls the timing and order in which the receiver is tuned to the channels. Depending on the embodiment, the channels can be contiguous or distributed in any appropriate pattern, for example if the spectrum of interest is discontinuous or if the emissions within the EM spectrum are better covered with noncontiguous channel assignments.

According to the presently disclosed method, the controller does not merely implement a fixed, predetermined scan schedule that remains unchanged until it is updated by an operator. Instead, the controller automatically implements periodic updates that improve the scan schedule while scanning by applying a "cognitive" artificial intelligence strategy of reinforcement learning to received signal data so as to continuously adapt and update the scan schedule in response to changes in behavior of the EM sources of interest.

More specifically, a cognitive "agent" is included in the controller which implements an over-arching strategy or "policy" that drives decisions regarding updates to the scan schedule. Updates are applied to the scan schedule based on temporal integration of observations made by the EM signal receiver, also referred to herein as "EM signal data," and reinforcements or "rewards" that are earned by the agent based on a degree of success of the scan schedule, where the degree of success is evaluated according to predetermined goals and success criteria.

Traditional approaches to artificial intelligence are based on scenarios such as "games" wherein a specific end result is defined and a degree of success can be determined with certainty. For example, most games can be "won," and many games assign point scores upon completion that indicate relative degrees of success. Traditional artificial intelligence implementations incorporate these defined end goals and scoring systems into their implementation of rewards and punishment that drive the learning process and enable the artificial intelligence.

In the case of signal scanning, however, neither of these traditional assumptions applies. Scanning is an ongoing process, such that it essentially has no end. As such, there is no defined endpoint at which the game is "won" or "lost." Also, it is impossible to determine a degree of success with certainty, because it is not possible to determine how many signals have been missed or misinterpreted during the scanning. Accordingly, the present disclosure implements a novel reward structure that is adapted to the dynamic, i.e. non-terminating nature of the signal scanning problem, and the impossibility of determining a degree of success with certainty.

In particular, because signal scanning is ongoing, i.e. there is no natural "end" or "outcome", the present disclosure evaluates performance and applies rewards on an ongoing, periodic basis. For example, evaluations and rewards can be applied, and the scan schedule can be updated, each time a full scan of the spectrum of interest is completed, or each time the receiver is switched from one channel to another.

In addition, the present disclosure implements a plurality of value scales that are applicable to different reward classes. For example, in a scenario where the goal is simply to identify all signal sources that are transmitting in the spectrum of interest, then a first value scale can assign strong rewards to "novel" detections, i.e. whenever new signal sources are detected, and a second value scale can assign weaker rewards when enhancing information is detected that helps to better characterize or identify a signal emitter that has been previously detected. In the more sophisticated case where some signal sources are "of interest" and others are not, or wherein there is a varied degree of "interest" assigned to different signal sources, then additional value scales and reward classes can be implemented, for example with each reward class applying to a different category of signal source.

In embodiments, an exponential scale is applied across the reward classes. Negative rewards or "punishments" are also implemented in embodiments of the present disclosure. For example, a negative reward can be applied if a specified degree of success is not achieved within a specified amount of time.

Based on the description and examples given herein, one of skill in the art will readily be able to devise and optimize an effective set of value scales according to any specific implementation of the disclosed method.

Once a degree of success has been determined and corresponding rewards have been applied, the agent then determines updates to the scan schedule by applying the policy to the EM signal data according to the specified goals and reinforcement that has been received.

As a result of this implementation of reinforcement learning in the controller, the scan schedule adapts and evolves rapidly and automatically in response to variable behavior of EM sources of interest, so as to continuously optimize the success of the scanning system in meeting its goals.

In embodiments a neural network is implemented in the agent to evaluate the observations of the EM signal receiver in preparation for determining the degree of success and the schedule for the next scan. In embodiments, the agent predicts an expected degree of success each time the scan schedule is updated, and compares the actual degree of success with the expected degree of success at the end of each scan. In some of these embodiments, the neural network includes an "actor-critic" architecture, whereby an "actor" module of the agent determines future changes to the scan schedule according to the specified policy, while a "critic" module determines the degree of success of the presently implemented scan schedule based on input data from the signal receiver. The critic module also determines the degree of reward that has been earned by the agent according to whether previously implemented changes of the scan schedule have resulted in an improved degree of success.

In embodiments, the critic module collaborates with a companion system that provides additional analysis of the signals detected by the receiver. For example, in embodiments a companion module such as a radar warning system or signal intelligence system provides input to the critic as to the degree of interest of detected signals, e.g. whether or not the detected signals are radar signals. In similar embodiments, a companion module helps to evaluate whether received signals are of interest, for example, as likely components of a "frequency-hopping" radio communication signal.

According to the disclosed method, the EM signal receiver performs one or more initial scans of the spectrum of interest according to a predetermined "initial" scan schedule that is implemented by the controller agent, after which scan schedule updates are periodically applied by the agent to preceding scan schedules to create updated scan schedules that direct subsequent scans of the spectrum of interest, where the agent automatically creates the scan schedule updates by applying reinforcement learning to EM signal data arising from detections by the receiver of the signals of interest during the initial and subsequent scans of the spectrum of interest, and prediction therefrom of future behavior of the signals of interest.

The initial scan schedule can be determined by a combination of purely theoretical predictions and manual and/or automated analysis during a "training" process of synthesized and/or actual, previously detected signals. For example, the controller can be initiated using a relatively simple scan schedule, such as a schedule that sequentially samples the channels of the spectrum of interest with equal time intervals, and then a body of previously detected signals and/or synthetic signal data generated with controllable statistical properties can be provided to the controller as training data to which the controller can apply reinforcement learning to determine an optimal initial scan schedule. Once the training is complete, the system is ready to begin scanning the spectrum of interest.

In embodiments, the training data corresponds to a "known" set of actual or theoretical signal sources that have known characteristics. Accordingly, unlike actual signal scanning, the training process can be carried out under circumstances where the degree of success of the agent can be determined with a higher degree of certainty, including in ideal cases complete certainty. In some of these embodiments, negative rewards are applied during the training whereby negative values are assigned to scans that fail to detect signals that are known to be present in the training data and fit the criteria of the specified scan goals. This training process thereby helps to develop policies that will achieve a higher degree of success during the actual signal scanning. This process can also be helpful in setting the values scales and the success "expectations" to be used a basis for reinforcement during signal scanning, as discussed above, including negative reinforcement when specified expectations of success are not realized during specified time intervals.

The presently disclosed method is susceptible to a variety of specified goals. For example, a relatively simple goal might be to identify every EM source that transmits a signal within the spectrum of interest. Another possible goal is to identify every EM source of interest within a specified time interval after it begins to transmit. Yet another possible goal is to identify all EM sources that transmit more than a specified number of "events" (e.g. pulses) during a specified time interval within the spectrum of interest. In various embodiments, the goal can go beyond identifying EM sources and can include receiving a specified percentage of the transmissions of EM sources of interest, e.g. for intelligence analysis.

Embodiments implement asynchronous advantage actor/critic ("A3C") deep reinforcement learning, as described for example in "Asynchronous Methods for Deep Reinforcement Learning" Proceedings of the 33'rd International Conference on Machine Learning, New York, N.Y., USA, 2016. JMLR: W&CP volume 48, https://arxiv.org/pdf/1602.01783.pdf, (incorporated herein in its entirety for all purposes), whereby the controller instantiates a plurality of "worker" agents that operate in parallel to analyze the received signals and propose recommended changes to the scan schedule according to a plurality of different strategies and policies. The proposed changes are provided to a global or "network" agent that arbitrates and selects which of the proposals, or what combination thereof, to adopt, and in what proportion, as influenced at least in part by relative amounts of rewards that have been received by the global agent when weight has been previously given to the proposals of each of the worker agents. Each of these worker agents and/or the global agent can have an actor-critic architecture.

A first general aspect of the present disclosure is a scanning system configured to detect signals within a spectrum of interest. The scanning system includes an electromagnetic ("EM") signal receiver, a controller configured to determine and implement a scan schedule that dictates a pattern of frequencies to which the EM signal receiver is tuned and a timing thereof, and an agent instantiated in the controller;

The controller is configured to cause the signal receiver to perform at least one initial scan of the spectrum of interest according to an initial scan schedule, and then perform a plurality of subsequent scans of the spectrum of interest according to a series of periodically updated scan schedules that are automatically created by the agent during the initial and subsequent scans.

The agent is configured to create each of the updated scan schedules by determining and applying a schedule update to a preceding scan schedule, said schedule update being determined according to an application of reinforcement learning by the agent to EM signal data arising from detections by the signal receiver of the signals of interest.

The reinforcement learning including estimating an actual degree of scanning success applicable to the preceding scan schedule by applying to the EM signal data a plurality of value scales applicable to a corresponding plurality of reward classes, awarding at least one reinforcement to the agent according to a comparison between the actual degree of scanning success and a previously determined expected degree of scanning success applicable to the preceding scan schedule, according to said reinforcement, determining by the agent of the schedule update, applying the schedule update to the preceding scan schedule to create the updated scan schedule, and determining an expected degree of success for the updated scan schedule.

In embodiments, the agent is configured to apply an exponential scale to the value scales across the plurality of reward classes.

In any of the above embodiments, the reinforcements can include negative rewards applied to the agent when a specified degree of scanning success is not achieved within a specified number of scans or within a specified time period.

In any of the above embodiments, the spectrum of interest can be divided into a plurality of frequency "channels," each of which is narrower than a bandwidth of the signal receiver, and wherein the initial and updated scan schedules dictate patterns of retuning of the EM signal receiver to center frequencies of the channels and a timing thereof.

In any of the above embodiments, the agent can comprise an actor module that is configured to determine the scan schedule updates and apply the scan schedule updates to the preceding scan schedules, the agent further comprising a critic module that is configured to estimate the actual degrees of scanning success after the scans and to award the reinforcements to the actor module.

In any of the above embodiments, the controller can be configured to determine the initial scan schedule by applying reinforcement learning during a training session to a training EM data set comprising at least one of synthetic signal data and previously obtained EM signal data. In some of these embodiments the training EM data set corresponds to a known set of actual and/or theoretical signal sources that have known characteristics. And in some of these embodiments the agent is configured to apply negative reinforcement during the training session whenever a scan of the training EM data fails to detect an EM signal of interest that is known to be present in the training EM data set.

Any of the above embodiments can further comprise a companion system that is configured to provide EM signal data companion analysis to the agent. In some of these embodiments the companion analysis includes at least one of distinguishing types of EM sources and determining their relative degrees of interest.

In any of the above embodiments, the agent can comprise a global agent and a plurality of worker agents, wherein each of the worker agents is configured to independently apply reinforcement learning to the EM signal data according to a data analysis strategy, derive therefrom a scan schedule gradient, and provide the scan schedule gradient to the global agent; and wherein the global agent is configured to create the updated scan schedules by applying the scan schedule gradients received from the worker agents.

A second general aspect of the present disclosure is a method of automatically determining and implementing updates to a scan schedule that dictates a pattern of frequencies to which an electromagnetic ("EM") signal receiver is tuned and a timing thereof. The method includes performing by the signal receiver of at least one initial scan of a spectrum of interest according to an initial scan schedule implemented by a controller of the signal receiver, and performing by the signal receiver of a plurality of subsequent scans of the spectrum of interest according to a series of periodically updated scan schedules that are automatically created during the initial and subsequent scans by an agent instantiated in the controller.

The agent creates each of the updated scan schedules by applying a schedule update to a preceding scan schedule, said schedule update being determined according to application by the agent of reinforcement learning to EM signal data arising from detections by the signal receiver of the signals of interest.

The reinforcement learning includes estimating an actual degree of scanning success applicable to the preceding scan schedule by applying to the EM signal data a plurality of value scales applicable to a corresponding plurality of reward classes, awarding at least one reinforcement to the agent according to a comparison between the actual degree of scanning success and a previously determined expected degree of scanning success applicable to the preceding scan schedule, according to said reinforcement, determining the schedule update, applying the schedule update to the preceding scan schedule to create the updated scan schedule, and determining an expected degree of success for the updated scan schedule.

In embodiments, an exponential scale is applied across the value scales of the plurality of reward classes.

In any of the above embodiments, the reinforcements can include negative rewards applied to the agent when a specified degree of scanning success is not achieved within a specified number of scans or within a specified time period.

In any of the above embodiments, the spectrum of interest can be divided into a plurality of frequency "channels," each of which is narrower than a bandwidth of the signal receiver, and wherein the initial and updated scan schedules dictate patterns of retuning of the EM signal receiver to center frequencies of the channels and a timing thereof.

In any of the above embodiments, the agent can comprise an actor module that determines the scan schedule updates and applies the scan schedule updates to the preceding scan schedules, the agent further comprising a critic module that estimates the actual degrees of scanning success after the scans and awards the reinforcements to the actor module.

In any of the above embodiments, the initial scan schedule can be determined by the controller by applying reinforcement learning during a training session to a training EM data set comprising at least one of synthetic signal data and previously obtained EM signal data. In some of these embodiments, the training EM data set corresponds to a known set of actual and/or theoretical signal sources that have known characteristics. And in some of these embodiments, negative reinforcement is applied to the agent during the training session whenever a scan of the training EM data fails to detect an EM signal of interest that is known to be present in the training EM data set.

In any of the above embodiments, a goal of the scan schedule can include at least one of:
   detecting all EM sources of interest that are within range of the EM signal receiver and are transmitting signals of interest within the spectrum of interest;
   detecting all EM sources of interest that are within range of the EM signal receiver and that transmit at least a minimum number of events during a specified time interval within the spectrum of interest;
   receiving a specified percentage of signals of interest transmitted by at least one EM source of interest; and
   detecting all EM sources of interest that are within range of the EM signal receiver and are transmitting signals of interest and then repeating detection of the EM sources within specified time ranges.

Any of the above embodiments can further comprise providing by a companion system to the agent of EM signal data companion analysis. And in some of these embodiments the companion analysis includes at least one of distinguishing types of EM sources and determining their relative degrees of interest.

In any of the above embodiments, the agent can comprise a global agent and a plurality of worker agents, wherein each of the worker agents independently applies reinforcement learning to the EM signal data according to a data analysis strategy, derives therefrom a scan schedule gradient, and provides the scan schedule gradient to the global agent; and the global agent applies the scan schedule gradients received from the worker agents when creating the scan schedule updates.

A third general aspect of the present disclosure is non-transient media comprising software recorded thereupon that is able to direct a controller to cause an electromagnetic ("EM") signal receiver to scan a spectrum of interest according to a scan schedule that dictates a pattern of frequencies to which the signal receiver is tuned and a timing thereof.

The software is further configured to direct the controller to implement updates to the scan schedule by causing the signal receiver to perform at least one initial scan of the spectrum of interest according to an initial scan schedule, followed by a plurality of subsequent scans of the spectrum of interest according to a series of periodically updated scan schedules that are automatically created during the initial and subsequent scans by an agent that is instantiated by the software in the controller.

The software is further configured to cause the agent to create each of the updated scan schedules by applying a schedule update to a preceding scan schedule, said schedule update being determined according to application by the agent of reinforcement learning to EM signal data arising from detections by the signal receiver of the signals of interest.

The reinforcement learning includes estimating an actual degree of scanning success applicable to the preceding scan schedule by applying to the EM signal data a plurality of value scales applicable to a corresponding plurality of reward classes, awarding at least one reinforcement to the agent according to a comparison between the actual degree of scanning success and a previously determined expected degree of scanning success applicable to the preceding scan schedule, according to said reinforcement, determining the schedule update, applying the schedule update to the preceding scan schedule to create the updated scan schedule, and determining an expected degree of success for the updated scan schedule.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1 is a block diagram that illustrates the receiver, controller, and spectrum of interest in embodiments of the present disclosure;

FIG. 4 is a block diagram that illustrates an embodiment of the present disclosure that includes a plurality of worker agents;

DETAILED DESCRIPTION

Figure 2A:
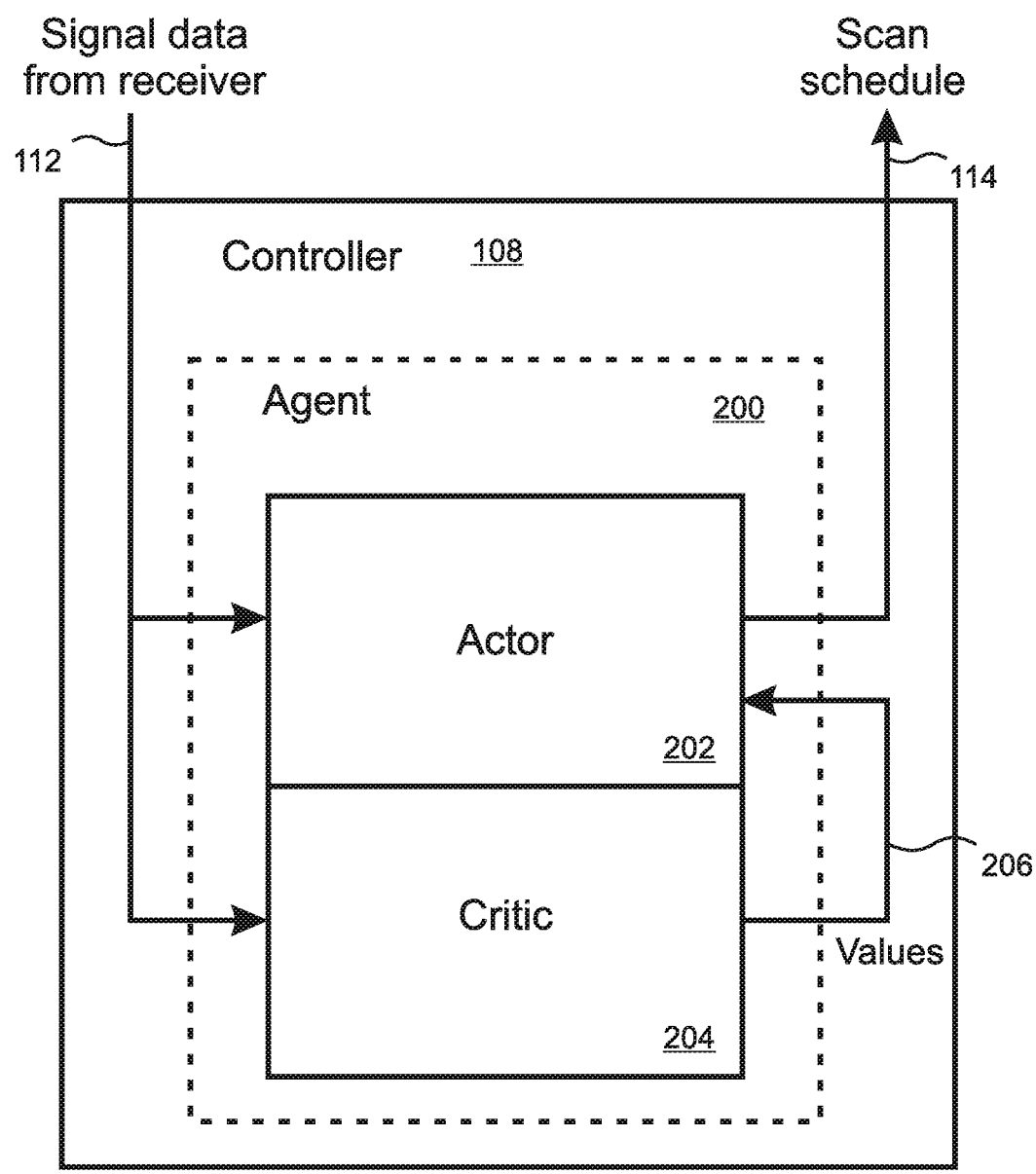
FIG. 2A is a block diagram that illustrates the controller in embodiments of the present disclosure.

With reference to FIG. 1, the present disclosure is a system 118 and method of creating and updating a scan schedule for an EM signal receiver 100 that optimizes the receipt of signals of interest from within a spectrum of interest 102 based on predictions of EM source behavior even when said behavior is variable. The present disclosure is applicable to circumstances wherein at least one EM source is transmitting at least one EM signal of interest over at least one frequency within the spectrum of interest 102 according to a transmission pattern that is not known a priori to a user.

According to the present disclosure, the EM signal receiver 100 is only configured to detect signals transmitted at frequencies that lie within a receiver bandwidth 104 that surrounds a "tuned" frequency 106 to which the EM signal receiver 100 is tuned, wherein the receiver bandwidth 104 is narrower than the spectrum of interest 102. Accordingly, the EM signal receiver 100 is required to "scan" the spectrum of interest 102 so as to discover and monitor as many signals of interest as possible within the spectrum of interest 102.

Specifically, a controller 108 of the signal receiver 100 directs the receiver 100 to shift its tuned frequency 106 in a time-dependent manner, according to a "scan schedule" that dictates the timing and frequency pattern of the scanning, so as to discover and monitor signals of interest throughout the spectrum of interest 102. In embodiments, the spectrum of interest 102 is divided into a plurality of "channels" 110, each of which has a frequency width that is not larger than the bandwidth 104 of the receiver 100, and the scan schedule controls the order in which the receiver's tuned frequency 106 is shifted between center frequencies 116 of the channels 110, and how long the receiver's tuned frequency 106 dwells at each of the channels 110. In some embodiments the channels are contiguous and equally spaced, while in other embodiments the channels are created in real time and have center frequencies that are distributed arbitrarily within a contiguous or non-contiguous spectrum of interest.

According to the presently disclosed method, the controller 108 does not merely implement a fixed, predetermined scan schedule 114 that remains unchanged until it is updated by an operator. Instead, the controller 108 automatically and dynamically updates and improves the scan schedule 114 on an ongoing basis while scanning by applying a "cognitive" artificial intelligence strategy of reinforcement learning to signal data 112 obtained from the EM signal receiver 100 so as to continuously adapt and update the scan schedule 114 in response to changes in behavior of the EM sources of interest. As part of this artificial intelligence approach, the present disclosure implements a novel reward structure that is adapted to the dynamic, i.e. non-terminating nature of the signal scanning problem, and the impossibility of determining a degree of success with certainty.

More specifically, with reference to FIG. 2A, a cognitive "agent" 200 is instantiated in the controller 108 which implements an over-arching strategy or "policy" that drives decisions regarding changes and updates to the scan schedule 114. The updates and changes are based on temporal integration of data provided by the EM signal receiver 100 and reinforcements or "rewards" that are earned by the agent 200 based on a degree of success of the scan schedule 114, where the degree of success is evaluated according to predetermined goals and success criteria. In embodiments, the rewards earned by the agent 200 are based on how much the degree of success has been improved by previously implemented updates and changes.

Because signal scanning is ongoing, i.e. there is no natural "end" or "outcome", the present disclosure evaluates performance and applies rewards on a periodic, ongoing basis. For example, evaluations and rewards can be applied to the agent 200, and the scan schedule can be updated by the agent 200, each time a full scan of the spectrum of interest 102 is completed, or each time the receiver 100 is switched from one channel 110 to another.

In addition, the present disclosure implements a plurality of value scales that are applicable to different reward classes. For example, in a scenario where the goal is simply to identify all signal sources that are transmitting in the spectrum of interest 102, then a first value scale can assign strong rewards to "novel" detections, i.e. whenever new signal sources are detected, and a second value scale can assign weaker rewards when enhancing information is detected that helps to better characterize or identify a signal emitter that has been previously detected. In the more sophisticated case where some signal sources are "of interest" and others are not, or wherein there is a varied degree of "interest" assigned to different signal sources, then additional value scales and reward classes can be implemented, for example with each reward class applying to a different category of signal source.

In embodiments, an exponential scale is applied across the reward classes. Negative rewards or "punishments" are also implemented in embodiments of the present disclosure.

For example, a negative reward can be applied if a specified degree of success is not achieved within a specified amount of time.

Based on the description and examples given herein, one of skill in the art will readily be able to devise and optimize an effective set of value scales according to any specific implementation of the disclosed method.

As a result of this implementation of reinforced learning, the scan schedule 114 adapts and evolves rapidly and automatically in response to variable behavior of EM sources of interest, so as to continuously optimize the success of the scanning system 118 in meeting its goals.

In embodiments, a neural network is implemented in the agent 200 to evaluate the observations 112 of the EM signal receiver 100 in preparation for evaluating the degree of success. In the embodiment of FIG. 2A, the neural network includes an "actor-critic" architecture, whereby the "actor" module 202 of the agent 200 determines future changes to the scan schedule while the "critic" module 204 assigns a value 206 to the degree of success of the presently implemented scan schedule 114 based on input data 112 from the signal receiver 100. The critic module 204 also determines the degree of reward that has been earned by the agent 200 according to whether previously implemented changes of the scan schedule 114 have resulted in an improved degree of success 206.

Figure 2B:
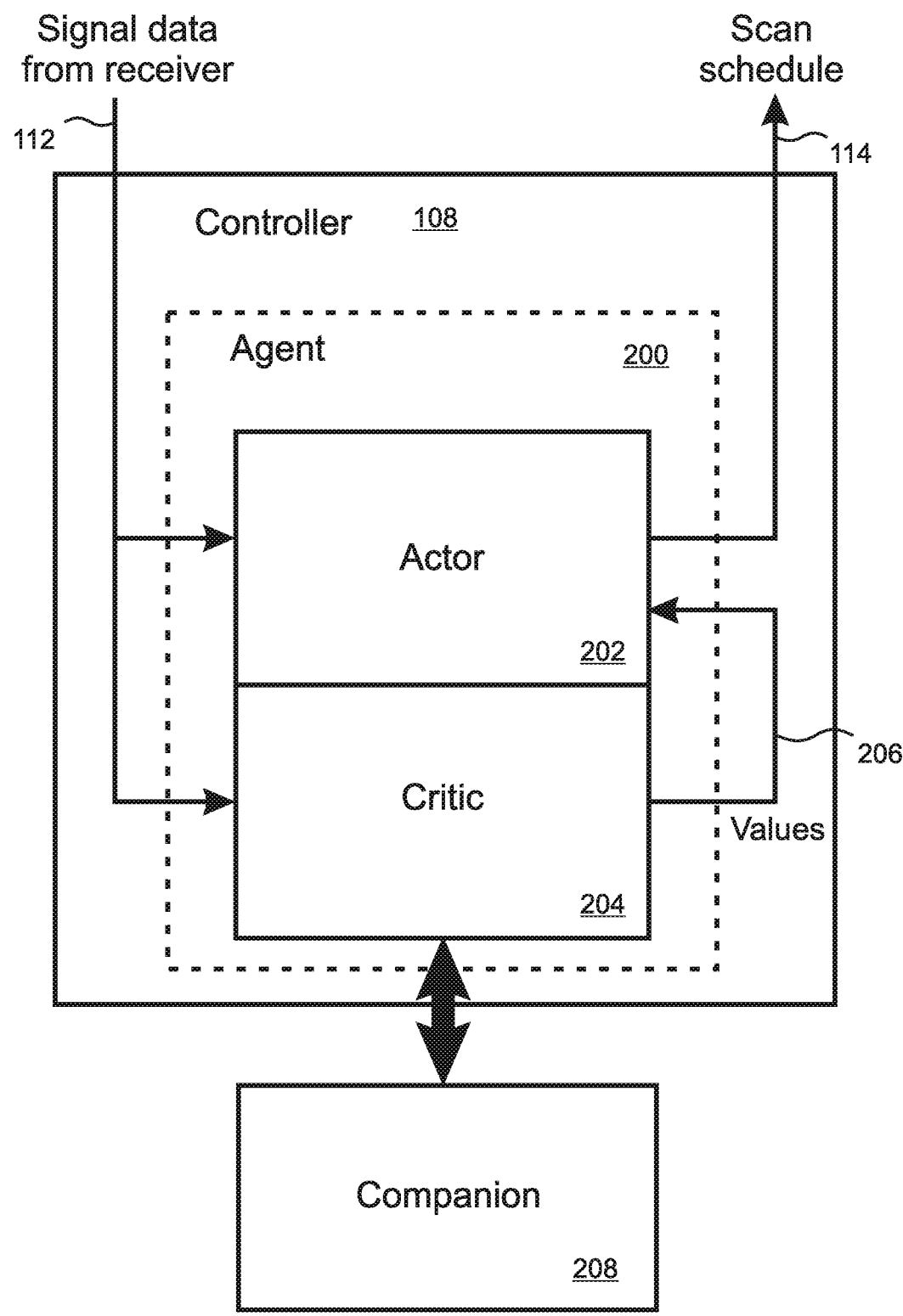
FIG. 2B is a block diagram that illustrates interaction of the controller of FIG. 2A with a companion system in embodiments of the present disclosure.

With reference to FIG. 2B, in embodiments the critic module 204 collaborates with a companion system 208 that provides additional analysis of the signals 112 detected by the EM receiver 100. For example, in some embodiments a companion module 208 such as a radar warning receiver or signal intelligence system provides input to the critic 204 as to the degree of interest of detected signals 112, e.g. whether or not the detected signals 112 are radar signals. In similar embodiments, a companion module 208 helps to evaluate whether received signals 112 are of interest, for example as likely components of a "frequency-hopping" radio communication signal.

According to the disclosed method, the EM signal receiver 100 performs one or more initial scans of the spectrum of interest 102 according to a predetermined "initial" scan schedule that is implemented by the agent 200, after which scan schedule updates are periodically applied by the agent 200 to preceding scan schedules to create updated scan schedules that direct subsequent scans of the spectrum of interest 102, where the agent 200 automatically creates the scan schedule updates by applying reinforcement learning to EM signal data 112 arising from detections by the receiver 100 of the signals of interest during the initial and subsequent scans of the spectrum of interest, and prediction therefrom of future behavior of the signals of interest.

Figure 3A:
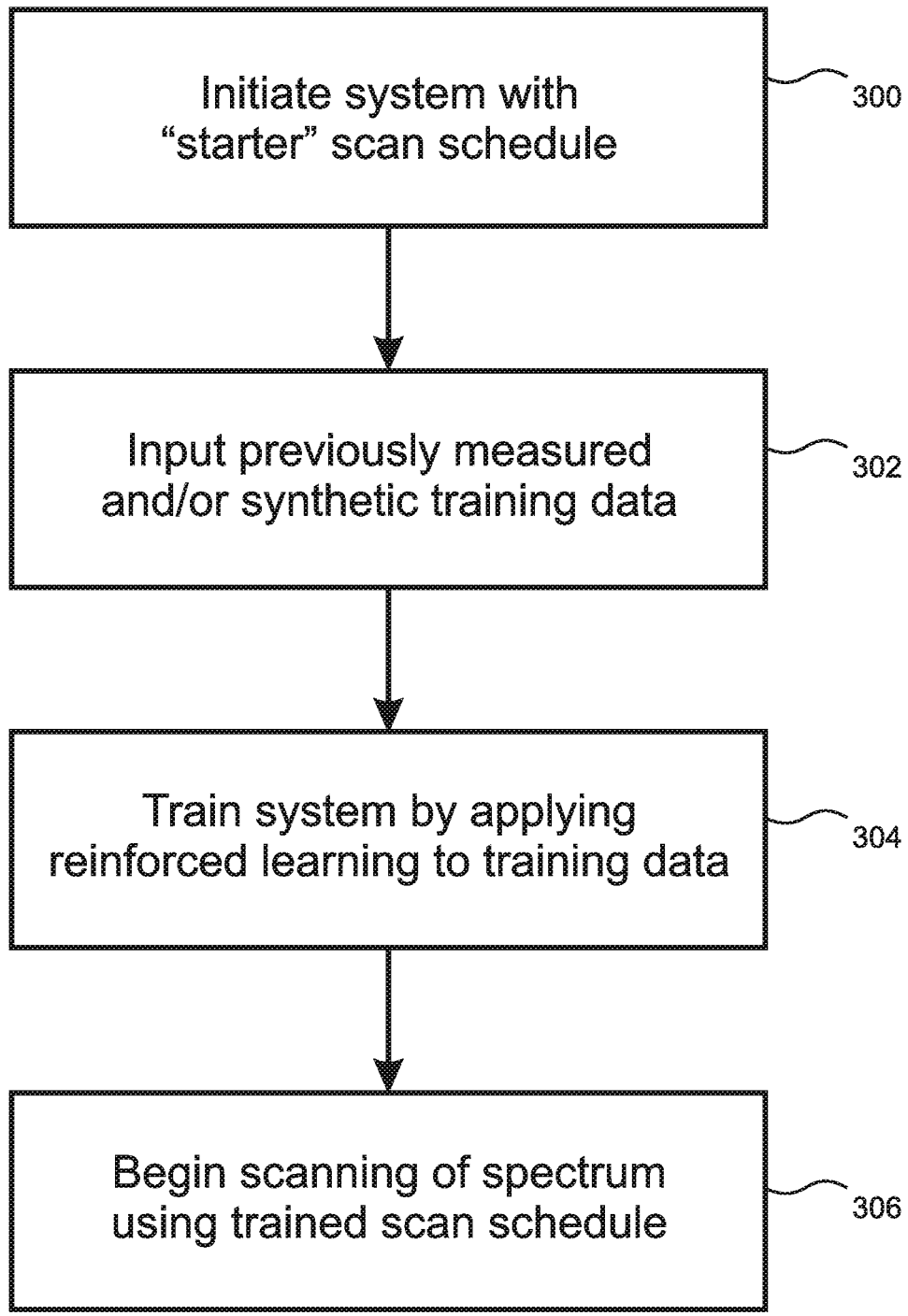
FIG. 3A is a flow diagram that illustrates agent training in a method embodiment of the present disclosure.

In various embodiments the initial scan schedule is determined by any combination of purely theoretical predictions and manual and/or automated analysis of previously detected signals. With reference to FIG. 3A, in some embodiments the controller 108 is instantiated using a "starter" scan schedule 300, such as a schedule that sequentially samples the channels of the spectrum of interest with equal time intervals. A body of training data, which can be previously detected signals and/or synthetic signal data generated with controllable statistical properties, is then input 302 to the controller 108, and the controller 108 is trained by applying cognitive reinforced learning to the data 304, so that the "starter" scan schedule is modified and optimized to create an optimized initial scan schedule that can be used as a starting point when scanning of the spectrum of interest commences 306.

In embodiments, the training data corresponds to a "known" set of actual or theoretical signal sources that have known characteristics. Accordingly, unlike actual signal scanning, the training process 304 can be carried out under circumstances where the degree of success of the agent 200 can be determined with a higher degree of certainty, including in ideal cases complete certainty. In some of these embodiments, negative rewards are applied during the training 304 whereby negative values are assigned to scans that fail to detect signals that are known to be present in the training data and fit the criteria of the specified scan goals. This training process 304 thereby helps to develop policies that will achieve a higher degree of success during the actual signal scanning 306. This process can also be helpful in setting the values scales and the success "expectations" to be used a basis for reinforcement during signal scanning 306, as discussed above, including negative reinforcement when specified expectations of success are not realized during specified time intervals.

In embodiments, once scanning has commenced 306, data from the receiver can be added to the training data so that the starter scan schedule is able to evolve into a schedule that is optimized for scanning the actual electromagnetic environment of the spectrum of interest 102.

Figure 3B:
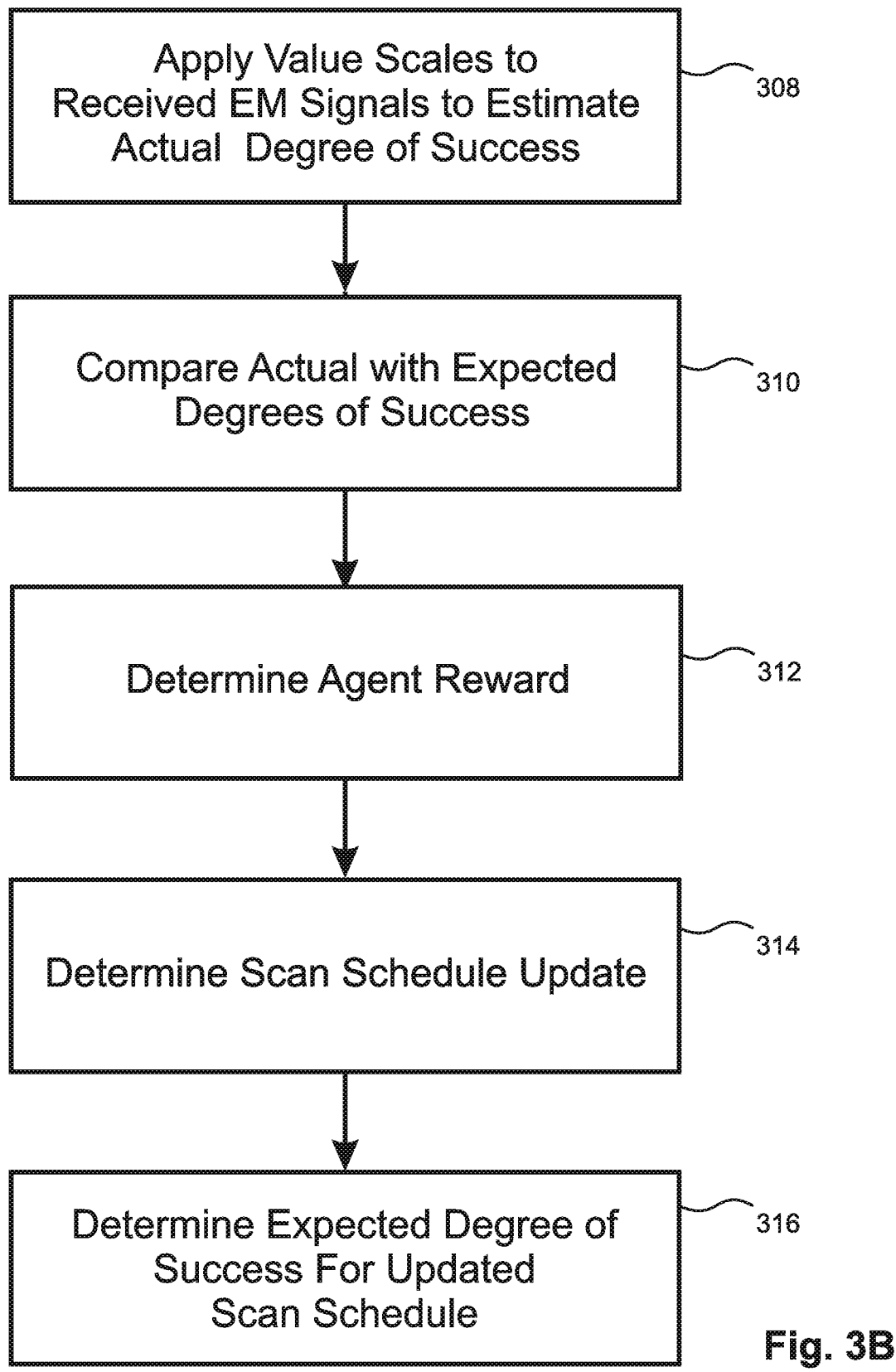
FIG. 3B is a flow diagram that illustrates reinforcement learning in an embodiment of the present disclosure.

The scanning then proceeds according to a series of periodically updated scan schedules that are automatically determined during the initial and subsequent scans by the agent 200. With reference to FIG. 3B, in embodiments prior to each scan schedule update the agent applies value scales as discussed above to EM signal data arising from detections that have been made by the receiver of the signals of interest 308, and compares the estimated actual degree of success with a previously determined expected degree of success 310. At least partly due to this comparison, a degree of agent reward is determined 312 so as to implement reinforcement learning as a basis for determining the next scan schedule update 314. Prior to implementing the updated scan schedule, the agent determines an expected degree of success for the updated scan schedule, based at least in part on prior experience, and on an assumption that the number, types, and behavior of the EM emitters of interest will not change drastically between the previous scan and the next one.

For example, in a scenario where the specified goal is to find and identify all signal sources that are transmitting within the spectrum of interest, the actual degree of success arising from a preceding scan might be estimated by calculating a success score for the scan according to the following four reward classes and associated value scales:

- +1 for each detection of a signal that is associated with a signal source that was previously unknown;
- +10 for each detection of a signal that enables identification of the corresponding signal source;
- +5 for detection of a signal that is transient, i.e. not transmitted for more than a specified threshold transmission time;
- −1 for detection of signals broadcast by signal sources that have previously been identified In embodiments, the magnitude of the resulting agent reward could be calculated as simply the difference between this success score, i.e. the estimated "actual" degree of success, and a "rolling" average of recent success scores obtained before the most recent scan, where this average could represent the "expected" degree of success for the scan.

This success scoring and agent rewarding scheme would cause the agent 200 to learn after only a few scan/reward cycles that it should implement scan schedule updates that will identify as many signal sources as possible, focusing especially on emissions that persist only for short periods of time, and then shift to collecting signals from previously unknown signal sources that have not yet been identified. In addition, the negatively scored value scale would cause the agent to learn that it should minimize scanning of channels within which all of the signal sources have already been fully identified.

The disclosed method is susceptible to a variety of specified goals. For example, as in the example given above, a relatively simple goal might be to identify every EM source that transmits a signal within the spectrum of interest. Another possible goal is to identify every EM source of interest within a specified time interval after it begins to transmit. Yet another possible goal is to identify all EM sources that transmit more than a specified number of "events" (e.g. pulses) within the spectrum of interest during a specified time interval. In various embodiments, the goal can go beyond identifying EM sources and can include receiving a specified percentage of the transmissions of EM sources of interest, e.g. for intelligence analysis.

With reference to FIG. 4, embodiments implement asynchronous multiple-worker actor/critic deep reinforcement learning, as described for example in "Asynchronous Methods for Deep Reinforcement Learning," Proceedings of the 33'rd International Conference on Machine Learning, New York, N.Y., USA, 2016; JMLR: W&CP volume 48, https://arxiv.org/pdf/1602.01783.pdf, (incorporated herein in its entirety for all purposes). In these embodiments, the controller 108 includes a "global" agent 400 that is supported by a plurality of "worker" agents 406, wherein each of the worker agents 406 includes a corresponding actor 408 and critic 410. The worker agents 406 operate in parallel to analyze the received signals 112 according to differing criteria and strategies. For example, some of the worker agents 406 may consider EM signal data 112 acquired over long periods of time when determining "gradients" 412, i.e. proposed changes to the scan schedule, while others consider only recently acquired EM signal data 112. The gradients 412 determined by the worker agents 406 are all provided to the global or "network" agent 400, which includes a global actor 402 and a global critic 404. The global agent 400 then applies reinforcement learning to the gradients 412 and selects which of the gradients 412, or what combination thereof, to adopt, and in what proportion, as influenced at least in part by relative amounts of rewards that have been received by the global agent 400 when weight has been previously given to the proposals 412 of each of the worker agents 406.

FIG. 4 illustrates a block diagram schematically illustrating computing devices and agents, in accordance with certain of the embodiments disclosed herein. For example, computing device can be implemented as the computing device associated with the controller 108 as described above in regard to FIG. 2A and FIG. 2B. Similarly, the computing device can be configured to perform one or more of the processes as described above in regard to FIG. 3A and FIG. 3B.

In certain implementations, the computing device can include any combination of a processor, a memory, a storage system, and an input/output (I/O) system. As can be further seen, a bus and/or interconnect is also provided to allow for communication between the various components listed above and/or other components not shown. Other componentry and functionality not reflected in the block diagram of FIG. 4 will be apparent in light of this disclosure, and it will be appreciated that other embodiments are not limited to any particular hardware configuration.

The processor can be any suitable processor, and may include one or more coprocessors or controllers, such as an audio processor, a graphics processing unit, or hardware accelerator, to assist in control and processing operations associated with computing device. In some embodiments, the processor can be implemented as any number of processor cores. The processor (or processor cores) can be any type of processor, such as, for example, a micro-processor, an embedded processor, a digital signal processor (DSP), a graphics processor (GPU), a network processor, a field programmable gate array or other device configured to execute code. The processors can be multithreaded cores in that they may include more than one hardware thread context (or "logical processor") per core. Processor can be implemented as a complex instruction set computer (CISC) or a reduced instruction set computer (RISC) processor.

In certain implementations, the processor can be configured to execute an Operating System (OS) which may include any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with computing device, and therefore may also be implemented using any suitable existing or subsequently-developed platform.

The memory can be implemented using any suitable type of digital storage including, for example, flash memory and/or random-access memory (RAM). In some embodiments, the memory can include various layers of memory hierarchy and/or memory caches as is sometimes done and as will be appreciated. The memory can be implemented as a volatile memory device such as, but not limited to, a RAM, dynamic RAM (DRAM), or static RAM (SRAM) device. The storage system can be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

In certain implementations, the memory can include one or more software modules as shown in FIG. 4. The various software modules can include instructions that, when executed by processor, can cause the processor to perform one or more of the process steps and functions as described herein. Similarly, the various software modules can include instructions for causing the processor to perform the process as outlined herein.

The I/O system can be configured to interface between various I/O devices and other components of the computing device. I/O devices may include, but not be limited to, a user interface, a display element, and a network interface.

It will be appreciated that in some embodiments, the various components of computing device can be combined or integrated in a system-on-a-chip (SoC) architecture. In some embodiments, the components may be hardware components, firmware components, software components or any suitable combination of hardware, firmware or software.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments the computing device can include additional, fewer, or alternative subcomponents as compared to those included in the example embodiment described herein.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications without departing from the spirit thereof. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

We claim:

1. A scanning system configured to detect signals within a spectrum of interest, the system comprising:
   an electromagnetic ("EM") signal receiver;
   a controller configured to determine and implement a scan schedule that dictates a pattern of frequencies to which the EM signal receiver is tuned and a timing thereof; and
   an agent instantiated in the controller;
   the controller being configured to cause the signal receiver to perform at least one initial scan of the spectrum of interest according to an initial scan schedule, and then perform a plurality of subsequent scans of the spectrum of interest according to a series of periodically updated scan schedules that are automatically created by the agent during the initial and subsequent scans;
   the agent being configured to create each of the updated scan schedules by determining and applying a schedule update to a preceding scan schedule, said schedule update being determined according to an application of reinforcement learning by the agent to EM signal data arising from detections by the signal receiver of the signals of interest;
   said reinforcement learning including:
      estimating an actual degree of scanning success applicable to the preceding scan schedule by applying to the EM signal data a plurality of value scales applicable to a corresponding plurality of reward classes;
      awarding at least one reinforcement to the agent according to a comparison between the actual degree of scanning success and a previously determined expected degree of scanning success applicable to the preceding scan schedule;
      according to said reinforcement, determining by the agent of the schedule update;
      applying the schedule update to the preceding scan schedule to create the updated scan schedule; and
      determining an expected degree of success for the updated scan schedule.

2. The system of claim 1, wherein the agent is configured to apply an exponential scale to the value scales across the plurality of reward classes.

3. The system of claim 1, wherein the reinforcements include negative rewards applied to the agent when a specified degree of scanning success is not achieved within a specified number of scans or within a specified time period.

4. The system of claim 1, wherein the spectrum of interest is divided into a plurality of frequency "channels," each of which is narrower than a bandwidth of the signal receiver, and wherein the initial and updated scan schedules dictate patterns of retuning of the EM signal receiver to center frequencies of the channels and a timing thereof.

5. The system of claim 1, wherein the agent comprises an actor module that is configured to determine the scan schedule updates and apply the scan schedule updates to the preceding scan schedules, the agent further comprising a critic module that is configured to estimate the actual degrees of scanning success after the scans and to award the reinforcements to the actor module.

6. The system of claim 1, wherein the controller is configured to determine the initial scan schedule by applying reinforcement learning during a training session to a training EM data set comprising at least one of synthetic signal data and previously obtained EM signal data.

7. The system of claim 6, wherein the training EM data set corresponds to a known set of actual and/or theoretical signal sources that have known characteristics.

8. The system of claim 7, wherein the agent is configured to apply negative reinforcement during the training session whenever a scan of the training EM data fails to detect an EM signal of interest that is known to be present in the training EM data set.

9. The system of claim 1, further comprising a companion system that is configured to provide EM signal data companion analysis to the agent.

10. The system of claim 9, wherein the companion analysis includes at least one of distinguishing types of EM sources and determining their relative degrees of interest.

11. The system of claim 1, wherein:
   the agent comprises a global agent and a plurality of worker agents;
   each of the worker agents is configured to:
      independently apply reinforcement learning to the EM signal data according to a data analysis strategy;
      derive therefrom a scan schedule gradient; and
      provide the scan schedule gradient to the global agent; and
   the global agent is configured to create the updated scan schedules by applying the scan schedule gradients received from the worker agents.

12. A method of automatically determining and implementing updates to a scan schedule that dictates a pattern of frequencies to which an electromagnetic ("EM") signal receiver is tuned and a timing thereof, the method comprising:

performing by the signal receiver of at least one initial scan of a spectrum of interest according to an initial scan schedule implemented by a controller of the signal receiver; and performing by the signal receiver of a plurality of subsequent scans of the spectrum of interest according to a series of periodically updated scan schedules that are automatically created during the initial and subsequent scans by an agent instantiated in the controller, the agent creating each of the updated scan schedules by applying a schedule update to a preceding scan schedule, said schedule update being determined according to application by the agent of reinforcement learning to EM signal data arising from detections by the signal receiver of the signals of interest;

said reinforcement learning including:
estimating an actual degree of scanning success applicable to the preceding scan schedule by applying to the EM signal data a plurality of value scales applicable to a corresponding plurality of reward classes;
awarding at least one reinforcement to the agent according to a comparison between the actual degree of scanning success and a previously determined expected degree of scanning success applicable to the preceding scan schedule;
according to said reinforcement, determining the schedule update;
applying the schedule update to the preceding scan schedule to create the updated scan schedule; and
determining an expected degree of success for the updated scan schedule.

13. The method of claim 12, wherein an exponential scale is applied across the value scales of the plurality of reward classes.

14. The method of claim 12, wherein the reinforcements include negative rewards applied to the agent when a specified degree of scanning success is not achieved within a specified number of scans or within a specified time period.

15. The method of claim 12, wherein the spectrum of interest is divided into a plurality of frequency "channels," each of which is narrower than a bandwidth of the signal receiver, and wherein the initial and updated scan schedules dictate patterns of retuning of the EM signal receiver to center frequencies of the channels and a timing thereof.

16. The method of claim 12, wherein the agent comprises an actor module that determines the scan schedule updates and applies the scan schedule updates to the preceding scan schedules, the agent further comprising a critic module that estimates the actual degrees of scanning success after the scans and awards the reinforcements to the actor module.

17. The method of claim 12, wherein the initial scan schedule is determined by the controller by applying reinforcement learning during a training session to a training EM data set comprising at least one of synthetic signal data and previously obtained EM signal data.

18. The method of claim 17, wherein the training EM data set corresponds to a known set of actual and/or theoretical signal sources that have known characteristics.

19. The method of claim 18, wherein negative reinforcement is applied to the agent during the training session whenever a scan of the training EM data fails to detect an EM signal of interest that is known to be present in the training EM data set.

20. The method of claim 12, wherein a goal of the scan schedule includes at least one of:

detecting all EM sources of interest that are within range of the EM signal receiver and are transmitting signals of interest within the spectrum of interest;
detecting all EM sources of interest that are within range of the EM signal receiver and that transmit at least a minimum number of events during a specified time interval within the spectrum of interest;
receiving a specified percentage of signals of interest transmitted by at least one EM source of interest; and
detecting all EM sources of interest that are within range of the EM signal receiver and are transmitting signals of interest and then repeating detection of the EM sources within specified time ranges.

21. The method of claim 12, further comprising providing by a companion system to the agent of EM signal data companion analysis.

22. The method of claim 21, wherein the companion analysis includes at least one of distinguishing types of EM sources and determining their relative degrees of interest.

23. The method of claim 12, wherein:
the agent comprises a global agent and a plurality of worker agents;
the method includes each of the worker agents:
independently applying reinforcement learning to the EM signal data according to a data analysis strategy;
deriving therefrom a scan schedule gradient; and
providing the scan schedule gradient to the global agent; and
creating the scan schedule updates includes applying by the global agent of the scan schedule gradients received from the worker agents.

24. Non-transitory computer readable media comprising:
software recorded thereupon that when executed by a controller configures the controller to:
cause an electromagnetic ("EM") signal receiver to scan a spectrum of interest according to a scan schedule that dictates a pattern of frequencies to which the signal receiver is tuned and a timing thereof; and
implement updates to the scan schedule by causing the signal receiver to perform at least one initial scan of the spectrum of interest according to an initial scan schedule, followed by a plurality of subsequent scans of the spectrum of interest according to a series of periodically updated scan schedules that are automatically created during the initial and subsequent scans by an agent that is instantiated in the controller,
wherein the executed software configures the agent to create each of the updated scan schedules by applying a schedule update to a preceding scan schedule, said schedule update being determined according to application by the agent of reinforcement learning to EM signal data arising from detections by the signal receiver of the signals of interest;
said reinforcement learning including:
estimating an actual degree of scanning success applicable to the preceding scan schedule by applying to the EM signal data a plurality of value scales applicable to a corresponding plurality of reward classes;
awarding at least one reinforcement to the agent according to a comparison between the actual degree of scanning success and a previously determined expected degree of scanning success applicable to the preceding scan schedule;
according to said reinforcement, determining the schedule update;
applying the schedule update to the preceding scan schedule to create the updated scan schedule; and determining an expected degree of success for the updated scan schedule.

\* \* \* \* \*